United States Patent
Kleefstra

(10) Patent No.: US 7,317,185 B2
(45) Date of Patent: Jan. 8, 2008

(54) TAMPER RESISTANT RADON DETECTOR

(75) Inventor: Meindert Kleefstra, Vancouver, WA (US)

(73) Assignee: AirAdvice, Inc., Portland, OR (US)

( * ) Notice: Subject to any disclaimer, the term of this patent is extended or adjusted under 35 U.S.C. 154(b) by 0 days.

(21) Appl. No.: 11/610,302

(22) Filed: Dec. 13, 2006

(65) Prior Publication Data

US 2007/0131859 A1  Jun. 14, 2007

Related U.S. Application Data

(60) Provisional application No. 60/750,709, filed on Dec. 14, 2005.

(51) Int. Cl.
*G01T 1/185* (2006.01)

(52) U.S. Cl. .................. 250/253; 250/DIG. 2

(58) Field of Classification Search .......... 250/DIG. 2, 250/253, 370.02, 370.01, 435
See application file for complete search history.

(56) References Cited

U.S. PATENT DOCUMENTS

| 4,859,865 | A | * | 8/1989 | Vandenburgh | ............... 250/253 |
| 4,871,914 | A |   | 10/1989 | Simon |   |
| 4,920,263 | A | * | 4/1990 | Fimian et al. | ............... 250/255 |
| 5,591,979 | A | * | 1/1997 | Ramsey | ....................... 250/383 |
| 6,768,116 | B1 | * | 7/2004 | Berman et al. | ............. 250/380 |

* cited by examiner

*Primary Examiner*—David Porta
*Assistant Examiner*—David S Baker
(74) *Attorney, Agent, or Firm*—Schwabe, Williamson & Wyatt

(57) ABSTRACT

Embodiments of the present invention provide for a tamper resistant radon detector monitoring system. Other embodiments may be described and claimed.

23 Claims, 3 Drawing Sheets

TAMPER RESISTANT RADON DETECTOR

RELATED APPLICATION

The present application is a nonprovisional application of provisional application No. 60/750,709, filed on Dec. 14, 2005, entitled "TAMPER RESISTANT RADON MEASUREMENT," and claims priority to said provisional application. The specification of said provisional application is also hereby fully incorporated by reference in its entirety, except for those sections, if any, that are inconsistent with this specification

TECHNICAL FIELD

Embodiments of the present invention relate to the field of radon detection, and more particular to a tamper resistant radon detector.

BACKGROUND

Radon is a radioactive gas that negatively affects indoor air quality. Extended, low-level exposure to this carcinogen has been associated with thousands of lung-cancer deaths per year.

Testing for radon requires that a radon detector be placed in a residence, or other target environment, for at least a couple of days. If high levels of radon are detected (4 picoCurie per liter of air (pCi/L) according to current EPA guidelines) certain remediation procedures should be employed. However, remediation is often expensive and time-consuming.

Due to the harmful effects of high radon levels and the difficulty of remediation, buyers are often asking for radon testing to be done prior to purchasing a home. Buyers frequently want the tests to be performed by someone not involved with the sale and therefore look to qualified testers. However, given the length of the test, even qualified, third-party testers cannot be assured of accurate data as the premises and detection equipment are typically not under their control for the entire duration of the test.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of this description, conjoining elements by the phrase "and/or" means that any of the elements may be used individually or with any combination of the other elements. For example, the phrase "A and/or B" means (A), (B), or (A and B), the phrase "A, B, and/or C" means (A), (B), (C), (A and B), (A and C), (B and C), or (A, B, and C), etc. Also, for the purposes of this description the phrase "A/B" means (A) or (B).

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

As used herein, reference to a "component" may refer to a hardware, a software, and/or a firmware component employed to obtain a desired outcome. Although only a given number of discrete components may be illustrated and/or described, such components may nonetheless be represented by additional components or fewer components without departing from the spirit and scope of embodiments of the invention.

Figure 1:
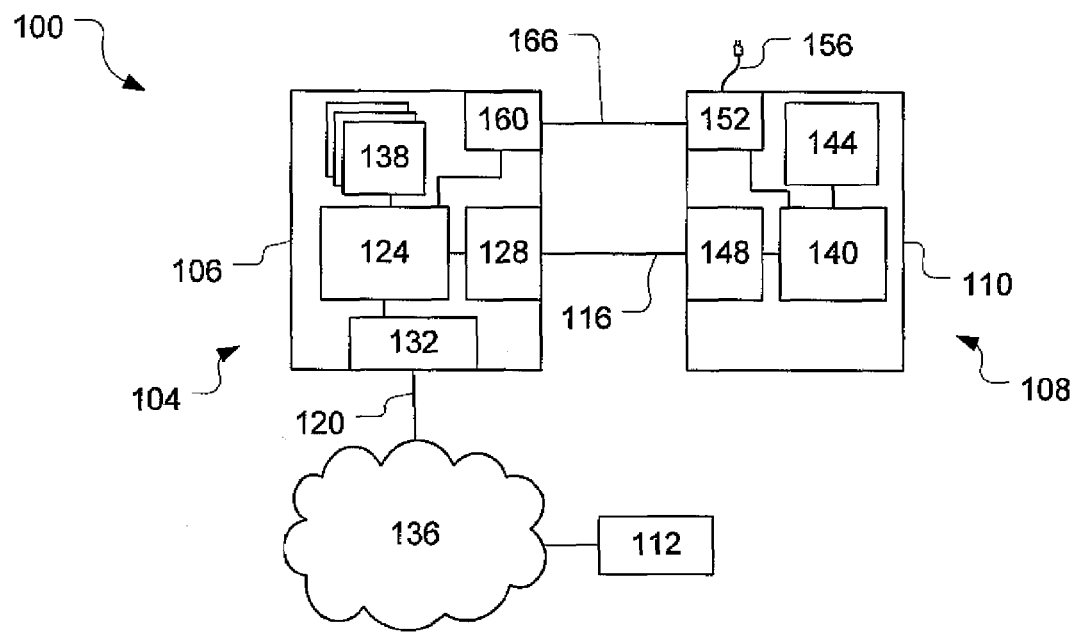
FIG. 1 illustrates a radon detector monitoring system in accordance with various embodiments of this invention.

FIG. 1 illustrates a radon detector monitoring system 100 in accordance with various embodiments of the present invention. In this embodiment, a collector 104, which has a housing 106 to encase its components, may be communicatively coupled to a radon detector 108 (hereinafter "detector 108"), which has a housing 110 to encase its components, through link 116. The collector 104 may also be communicatively coupled to an analyzer 112 through link 120. The collector 104 may include a controller 124 to control collection of radon data from the detector 108 and forwarding of the collected data to the analyzer 112 for analysis.

The controller 124 may utilize an interface 128 to communicate with the detector 108 over the link 116. In an embodiment the interface 128 may include a serial port and the link 116 may include a serial binary data interconnection or analog signal (measure with an analog to digital converter (ADC)). In an embodiment, the port and the data interconnection may be compatible with various standards and/or protocols, e.g., an RS-232, serial peripheral interface (SPI), inter-integrated circuit (I2C), universal asynchronous receiver/transmitter (UART), etc.

The controller 124 may utilize an interface 132 to communicate with the analyzer 112 over the link 120 and a network 136. In an embodiment the interface 132 may include a modem, e.g., a voiceband modem, and the link 120 may include a telephone line. In an embodiment the network 136 may be a wide area network, e.g., the Internet. In other embodiments, other types of interfaces, links, and/or networks may be used. Furthermore, in other embodiments other layouts of the various devices may be used, e.g., the analyzer 112 may be locally connected to the collector 104 and/or detector 108.

The detector 108 may include a controller 140, a radon sensor 144, and an interface 148, coupled to one another and to the link 116 as shown. The radon sensor 144 may sense radon levels in an environment surrounding the detector 108 and communicate data indicative of the sensed radon (hereinafter "radon data") to the controller 140. In an embodiment, the radon sensor 144 may be a solid-state continuous radon monitor using a PIN photodiode to count alpha decay particles from Radon isotopes such as RN-222.

The detector 108 may include an interface 148, similar to interface 128, including, e.g., a serial RS-232 port, to communicate directly with the collector 104 over the link 116. The controller 140 may control transmission of the radon data to the collector 104 via the interface 148. In some embodiments, the controller 124 may control the communication.

In an embodiment the detector 108 may accumulate and log running radon data over a period of, e.g., one week. Therefore, the interface 148 may have a one-week recirculating buffer to store this accumulated data. Averages of the accumulated data and/or periodic data values (e.g., hourly data) may be periodically uploaded to the collector 104. The frequency and procedure of radon reporting to the collector 104 may vary with different embodiments, some of which will be discussed in more detail below.

The collector 104, in addition to collecting and forwarding radon data to the analyzer 112, may also collect and forward radon test validation data (hereinafter "validation data"). In various embodiments, validation data may be collected by the controller 124 from validation sensors 138 and/or from the detector 108. The controller 124 may transmit collected validation data to the analyzer 112, along with the radon data, to validate a radon test that utilizes the collected radon data.

The interface 132 may include a buffer to store data collected by the controller 124 until it is uploaded to the analyzer 112. In an embodiment, the buffer may be designed to accommodate various reporting frequencies of the collector 104 to the analyzer 112 (e.g., once a day); the validation sensors 138 to the controller 124 (e.g., once a minute); and the radon sensor 144 to the controller 124 (e.g., once an hour). For example, in an embodiment the buffer may include data structures for the validation sensors 138 without having a dedicated data structure for the radon sensor 144. The controller 124 may record values from the radon sensor 144 by slicing it into the data structures for the validation sensors 138. This may be done after a predetermined identification sequence (e.g., a value repeated a certain number of times) that may indicate that the following data is radon data rather than validation data. This may prevent a radon data structure from being idle, e.g., filled with null values, for fifty-nine minutes (assuming validation data is logged every minute) until the next radon level is recorded.

In various embodiments the validation data may be any type of data that may be dispositive of a consistent radon test, e.g., data that has the capacity or quality of giving a tendency or inclination that the radon test was consistent throughout the testing period. A consistent radon test may be evidenced by recorded data that is reasonably or logically harmonious with expected data values and/or trends. Thus, the validation data may allow the analyzer 112 to determine whether there has been any interference with the detector 108 and/or the environment surrounding the detector 108 that may corrupt the results of a radon test.

Current EPA guidelines for performing a short-term radon test (e.g., 3-4 days) suggest that a radon detector should be placed in the lowest lived-in level of the home and all the windows and doors should be kept closed as much as possible for the duration of the test. Additionally, no fans or other machines, which bring in air from the outside should be operated. The purpose of these guidelines is that providing additional ventilation may reduce the present levels of radon and therefore the tested levels may be misleadingly low.

Accordingly, in some embodiments of this invention the validation data may be indoor air quality (IAQ) data, e.g., temperature, a relative humidity, carbon monoxide, carbon dioxide, volatile organic compounds, and/or particulates, obtained throughout the duration of the radon test. In these embodiments, the validation sensors 138 may include one or more sensors adapted to detect this type of data. The analyzer 112 may analyze the IAQ data to check for inconsistencies in the testing environment (in this embodiment it may be assumed that both the collector 104 and the detector 108 are disposed in the same general environment, which will be the case as long as the communication link 116 is not an exceedingly long link). Environmental inconsistencies detected from analysis of the IAQ validation data may be due to, e.g., windows and/or doors being opened, fans being deployed to purge the air of the testing environment, the collector 104 and the detector 108 being moved to an environment other than the target environment, etc. If no environmental inconsistencies are detected, the analyzer 112 may validate the results of the radon test. If environmental inconsistencies are detected, they may be noted in the test results and/or the test results may be invalidated.

In some embodiments, the validation data may also be used as the basis for its own test. For example, an IAQ test may be performed simultaneously with the radon test with the IAQ data also serving as validation data.

In some embodiments, validation data other than (or in addition to) IAQ data may be collected. For example, the radon sensor 144 may be associated with unique identification information, e.g., a serial number, a built date, etc. When the controller 140 collects radon data from the radon sensor 144 and reports the radon data to the collector 104, it may also collect and report this unique identification information as validation data. Therefore, the analyzer 112 may determine if the radon sensor 144 was replaced with another sensor during the test, perhaps one having less accumulated radon.

In an embodiment, the detector 108 may have a power module 152 coupled to a power cord 156. The power module 152 may provide power to a power module 160 of the collector 104 through a power cable 166. This power arrangement may provide other validation data for the analyzer 112. For example, in some embodiments recordation of IAQ data from the validation sensors 138 may occur at a higher frequency than recordation of the radon data from the radon sensor 144 (e.g., once per minute for the former and once per hour for the latter). Therefore, if the detector 108 experiences a power interruption (due to it being unplugged or a general power outage), even momentarily, a detectable absence of recorded IAQ data may result. If the analyzer 112 detects a power-off event (indicated by a gap in the IAQ data) followed by changes in radon data and/or IAQ data, the analyzer 112 may invalidate the results of the radon test. In this embodiment, periodic recording of the IAQ data may be considered validation data; however, in other embodiments an indexing record, or heartbeat, may be periodically recorded (e.g., every minute) and serve a similar function.

Figure 2:
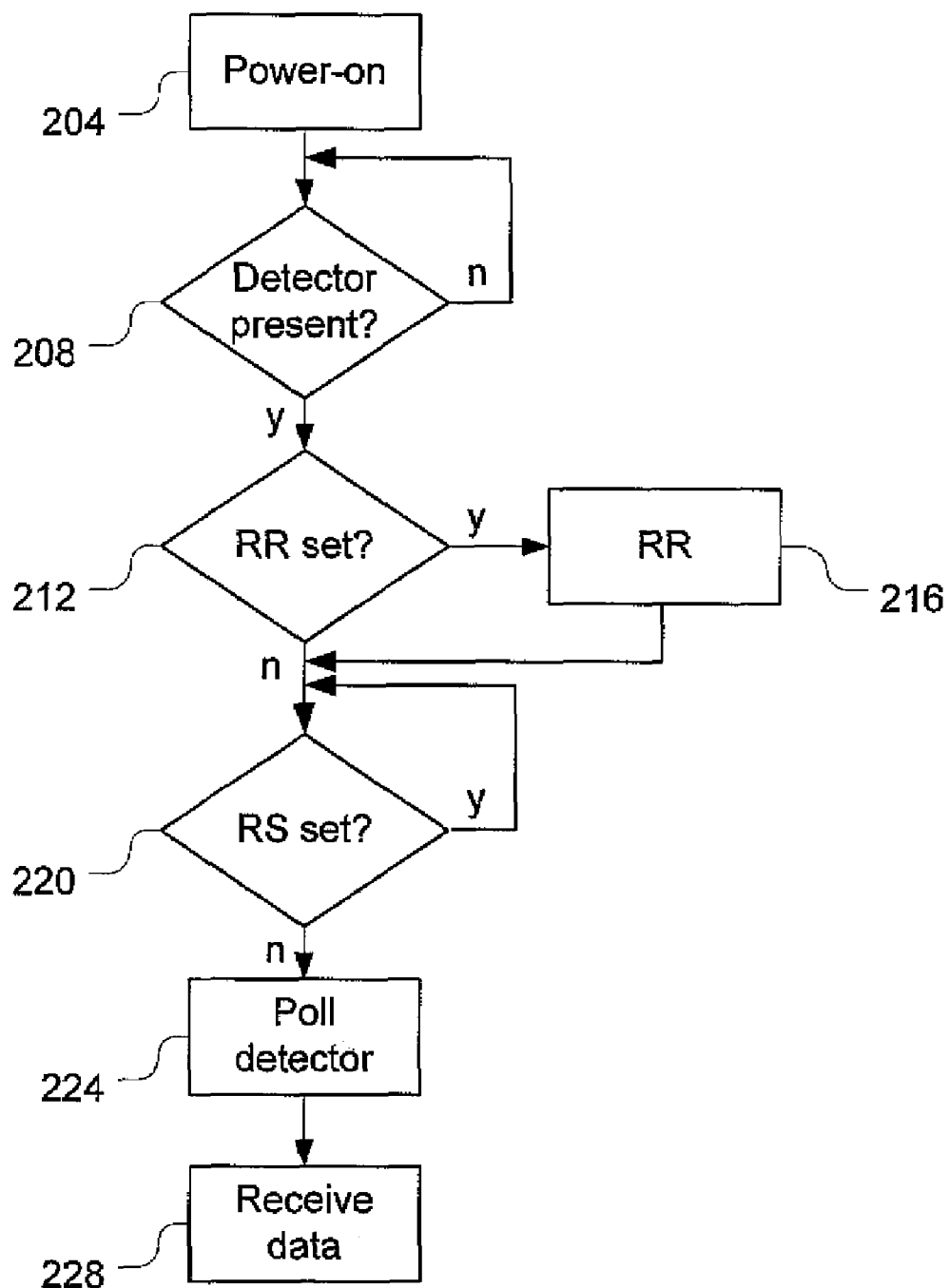
FIG. 2 illustrates a flowchart of a radon test in accordance with various embodiments of this invention.

FIG. 2 illustrates a flowchart of a radon test in accordance with various embodiments of the present invention. The radon test may be initiated with a power-on event of the collector 104 at block 204. The controller 124 may detect, e.g., by sending a request through interface 128 and awaiting an acknowledgement, for a communicatively coupled detector, e.g., detector 108, at block 208. If no detector is communicatively coupled to the collector 104, the controller 124 may periodically send detector requests until an acknowledgement is received. If an acknowledgement is received, signifying that the detector 108 is communicatively coupled to the collector 104, the controller 124 may determine if the detector 108 needs to be reset, e.g., by determining if a radon reset (RR) flag is set at block 212.

An RR flag may be set if the collector 104 has been powered off for more than a certain period of time (hereinafter "reset period"), e.g., two hours. This may be based on the assumption that being powered off for this reset period indicates that the collector 104 and/or detector 108 have been moved to a new location for a new IAQ and/or radon test. Accordingly, the detector 108 may need to be reset to prevent averaging new data with data in its buffer from a previous test.

In some embodiments, the RR flag may additionally or alternatively be set remotely from the analyzer 112. In some embodiments reset of the detector 108 may be restricted from being done locally at the detector 108. This restriction may prevent a user from interfering with the radon test by manually resetting the detector 108.

If the RR flag is set, the controller 124 may send an RR command to the detector 108 at block 216. The controller 124 may verify that the detector 108 has been reset by, e.g., looking an internal timer of the detector 108. After the detector 108 has been cleared, the controller 124 may determine whether an initial data suppression period (hereinafter "suppression period") has been passed, e.g., by determining if a radon suppression (RS) flag is set at block 220.

An RS flag may be set if the detector 108 is within the suppression period following a reset that is considered to be statistically unreliable. Radon events, or counts, detected by the radon sensor 144 may be infrequent due to the typical alpha-decay rate coupled with a relatively small volume of the radon sensor 144, e.g., one count per 1-3 hours. Therefore, an average of the data accumulated over a period of time may be a more descriptive statistic. At the front end of a radon test, however, there may be insufficient data to provide for this averaging. Therefore, to avoid reporting misleading data, the radon data may be suppressed for the suppression period, e.g., twenty-four hours, until enough events are accumulated to provide some reliability to the data. The controller 124 may record null data during the suppression period. After the suppression period the RS flag may be cleared and the controller 124 may poll the controller 140 by sending a radon data request at block 224. This polling may occur periodically, e.g., at the top of each hour, over the predetermined testing period, e.g., one week.

In response to the poll, the controller 140 may provide a string that includes validation data (e.g., identifying data on the radon sensor 144 such as built date and serial number), indexing data (e.g., current hour), and/or radon data (e.g., cumulative radon average, radon counts of the most recent period, etc.).

In an embodiment, the radon counts of the most recent period, may be considered validation data rather than radon data that is used as a basis for the radon test. It may be that interference by electronics may generate counts that appear as radon counts. In this embodiment, the raw data, as opposed to the averaged data, may be used by the analyzer 112 as validation data. If an anomalous event is observed, it may be tampering or malfunctioning of the detector 108 may be inducing these errors. The analyzer 112 may consider this data when validating a radon test. Additionally, statistical analysis may be applied to prevent skewing actual radon data from these types of events.

Figure 3:
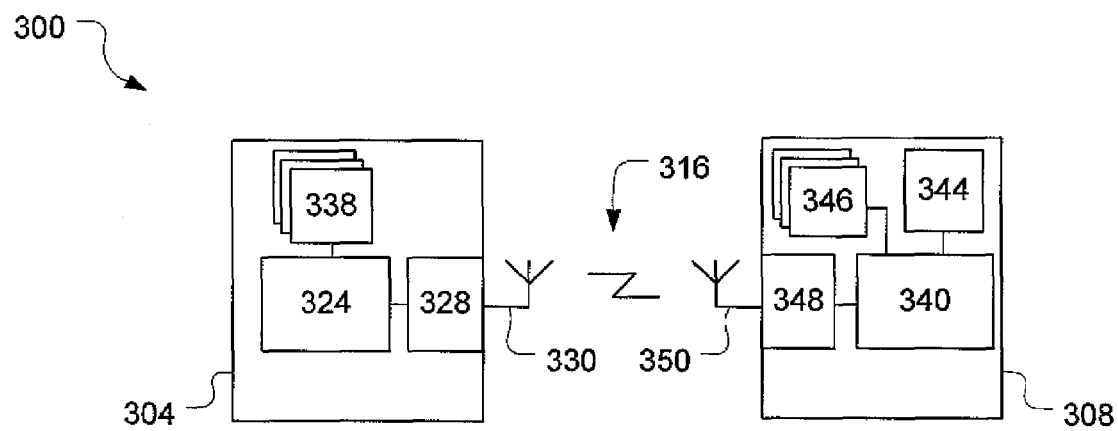
FIG. 3 illustrates a detector-collector arrangement in accordance with various embodiments of this invention.

FIG. 3 illustrates a collector-detector arrangement 300 in accordance with various embodiments of the present invention. In this embodiment, the collector-detector arrangement 300 may have a collector 304 and a detector 308 similar to, and substantially interchangeable with, like-named elements of radon detector monitoring system 100 described above. However, in this embodiment, the collector 304 may be communicatively coupled to the detector 308 via an over-the-air (OTA) link 316. The collector 304 may have a wireless interface 328 coupled to an antenna 330 and the detector 308 may have a wireless interface 348 coupled to antenna 350 to facilitate this wireless communication. In various embodiments the wireless interfaces may include wireless radio modules compatible with, e.g., ZigBee 1.0 specification ratified on Dec. 14, 2004. In other embodiments, the wireless interfaces may include modules additionally/alternatively compatible with other communication specifications and/or protocols.

The detector 308, in addition to having the radon sensor 344, may also include validation sensors 346 coupled to the controller 340. The validation sensors 346 may include sensors similar to the validation sensors 338, e.g., IAQ sensors. Having the validation sensors 346 in the detector 308 may ensure that validation data is coming from the same environment as the radon data. This may be helpful in a wireless embodiment such as this one, where the detector 308 may be disposed in a different location than the collector 304.

In various embodiments, validation sensors, e.g., sensors 338 and/or 346, may additionally/alternatively include sensors directed towards collecting validation data other than IAQ data. For example, in an embodiment the validation sensors 338 of the collector 304 may include a signal strength sensor. A signal strength sensor may periodically measure the received radio signal strength of communications from the detector 308 and record a received signal strength indication (RSSI). Analysis of the RSSI by the analyzer 112 may allow the analyzer 112 to determine if the relative location of the detector 308 and the collector 304 is changed throughout a radon test. An example of another embodiment, the sensors 346 may include a motion detector to detect whether the detector 308 has been moved during the radon test.

In various embodiments, the collector 304 may have a controller 324 to control collection and forwarding of radon data and validation data similar to the embodiment described with reference to FIG. 1.

Figure 4:
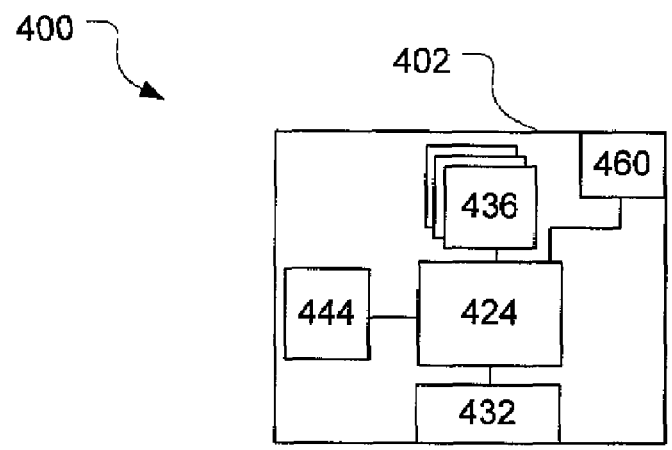
FIG. 4 illustrates a detector-collector in accordance with various embodiments of this invention.

FIG. 4 illustrates a collector-detector 400 in accordance with various embodiments of the present invention. The collector-detector 400 of this embodiment may combine components of a radon detector, e.g., detector 108, with components of a collector, e.g., collector 104, into a housing 402 of a single device. Accordingly, the collector-detector 400 may be substantially interchangeable with the collector 104 and the detector 108 in the radon monitoring system 100.

The collector-detector may include a controller 424 coupled to validation sensor(s) 436, a radon sensor 444, and a power module 460, as shown. The controller 424 may also be coupled to an interface 432 to communicatively couple the collector/detector 400 to an analyzer, e.g., analyzer 112.

Figure 5:
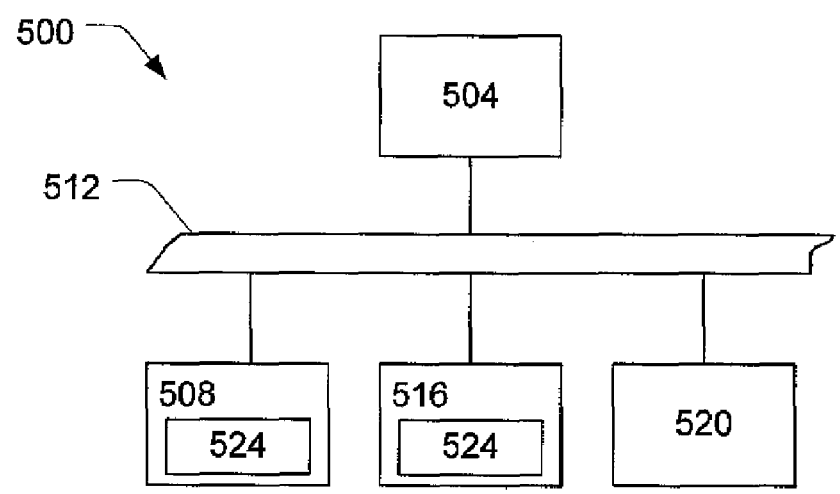
FIG. 5 illustrates a computing device in accordance with various embodiments of this invention.

FIG. 5 illustrates a computing device 500 capable of implementing various devices in accordance with embodiments of this invention. As illustrated, for the embodiments, computing device 500 includes one or more processor(s) 504, memory 508, and bus 512, coupled to each other as shown. Additionally, computing device 500 includes storage 516, and one or more communication interface(s) 520 coupled to each other, and the earlier described elements as shown.

Memory 508 and storage 516 may include in particular, temporal and persistent copies of collection/analysis logic 524, respectively. The collection/analysis logic 524 may include instructions that when accessed by the processor(s) 504 result in the computing device 500 performing operations or executions involved with various embodiments of this invention. In particular, in an embodiment the accessing of the collection/analysis logic 524 by the processor(s) 504 may facilitate collection and forwarding of radon and validation data as described above with reference to the controller 124. In another embodiment the accessing of the collection/analysis logic 524 by the processor(s) 504 may facilitate analysis of the radon and validation data as described above with reference to the analyzer 112. In still other embodiments, the accessing of the collection/analysis logic 524 may facilitate a combination of these operations.

In various embodiments, the memory 508 may include RAM, dynamic RAM (DRAM), static RAM (SRAM), synchronous DRAM (SDRAM), dual-data rate RAM (DDRRAM), etc.

In various embodiments, the processor(s) 504 may include one or more single-core processors, multiple-core processors, controllers, application-specific integrated circuits (ASICs), etc.

In various embodiments, storage 516 may include integrated and/or peripheral storage devices, such as, but not limited to, disks and associated drives (e.g., magnetic, optical), universal serial bus (USB) storage devices and associated ports, flash memory, read-only memory (ROM), electrically erasable programmable ROM (EEPROM), non-volatile semiconductor devices, etc. Storage 516 may be a storage resource physically part of the computing device 500 or it may be accessible by, but not necessarily a part of, the computing device 500. For example, the storage 516 may be accessed by the computing device 500 over a network.

In various embodiments, computing device 500 may have more or less elements, and/or different architectures.

Although certain embodiments have been illustrated and described herein for purposes of description of some embodiments, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
   a housing:
   a radon sensor encased within the housing and adapted to sense radon and to provide radon data indicative of sensed radon;
   a controller encased within the housing and coupled to the radon sensor and adapted to receive, over a predetermined period of time, radon data from the radon sensor and validation data to validate a radon test that utilizes the radon data;
   a memory adapted to store the received radon data; and
   the controller being further adapted to clear the memory in an event that the apparatus is powered-off for more than a predetermined reset period.

2. The apparatus of claim 1, wherein the validation data is indicative of at least an identification of the radon sensor.

3. The apparatus of claim 1, wherein the validation data is indicative of at least IAQ conditions surrounding the apparatus and the apparatus further comprises:
   one or more other sensors encased within the housing and coupled to the controller and adapted to sense IAQ conditions over the predetermined period of time.

4. The apparatus of claim 1, further comprising:
   an interface coupled to the controller and adapted to transmit radon data and validation data to a collector.

5. The apparatus of claim 4, wherein the interface comprises a wireless interface.

6. The apparatus of claim 1, wherein the validation data is dispositive of consistent use of the radon sensor, consistent placement of the apparatus, and/or consistent air quality of an environment surrounding the apparatus over the predetermined period of time.

7. A system comprising:
   a radon detector having a detector housing and a radon sensor encased within the detector housing, the radon sensor adapted to sense radon and to provide radon data indicative of sensed radon;
   an analyzer;
   a collector having a collector housing, a controller encased within the collector housing, a first interface, and a second interface; the controller communicatively coupled to the radon detector via the first interface and adapted to receive, over a predetermined period of time, radon data from the radon sensor and validation data to validate a radon test that utilizes the radon data, the controller further communicatively coupled to the analyzer via the second interface and adapted to transmit the radon data and the validation data to the analyzer, the analyzer adapted to validate the radon test based at least in part on the validation data; and
   an origination point of a reset command for the radon detector, the origination point consisting of the collector and/or the analyzer.

8. The system of claim 7, wherein the validation data is indicative of identification of the radon sensor.

9. The system of claim 8, wherein the validation data is further indicative of at least IAQ conditions surrounding the radon detector and the collector further comprises:
   one or more IAQ sensors encased within the collector housing and coupled to the controller.

10. The system of claim 7, wherein the validation data is indicative of at least motion of the radon detector and the collector further comprises:

one or more other sensors encased within the collector housing and coupled to the controller, the one or more other sensors including a received signal strength sensor.

11. The system of claim 8, wherein the one or more other sensors comprise at least two sensors including one or more IAQ sensors, a motion sensor, a received signal strength sensor, and/or a light sensor.

12. The system of claim 7, wherein radon detector further comprises:
a power module adapted to supply power to the collector and the controller, following a period of time during which the collector is powered off, is adapted to provide a reset command to the radon detector if the period of time is greater than a predetermined reset period.

13. The system of claim 7, wherein the collector is further adapted to transmit, to the analyzer, a predetermined radon data identification sequence prior to transmitting the radon data.

14. A system comprising:
a radon detector having a detector housing and a radon sensor and power module encased within the detector housing, the radon sensor adapted to sense radon and to provide radon data indicative if sensed radon;
a collector having a collector housing and a controller encased within the collector housing, the controller communicatively coupled to the radon sensor and adapted to receive, over a predetermined period of time, radon data from the radon sensor and validation data to validate a radon test that utilizes the radon data; and
the power module is adapted to supply power to the collector, and the controller, following a period of time during which the collector is powered off, is adapted to provide a reset command to the radon detector if the period of time is greater than a predetermined reset period.

15. A system comprising:
a radon detector having a detector housing and a radon sensor encased within the detector housing, the radon sensor adapted to sense radon and to provide radon data indicative of sensed radon;
a collector having a collector housing and a controller encased within the collector housing, the controller communicatively coupled to the radon sensor and adapted to receive, over a predetermined period of time, radon data from the radon sensor and validation data to validate a radon test that utilizies the radon data, the controller being further adapted to suppress radon data from the radon sensor for a suppression period.

16. The system of claim 15, wherein the validation data is dispositive of consistent use of the radon sensor, consistent placement of the apparatus, and/or consistent air quality of an environment surrounding the apparatus over the predetermined period of time.

17. A method comprising:
receiving, over a predetermined period of time, radon data indicative of sensed radon;
receiving, over the predetermined period of time, validation data to validate a radon test that utilizes said received radon data;
receiving an indication that a radon detector accumulating the radon data was powered off for an amount of time; and
providing a reset command to the radon detector if the amount of time is greater than a predetermined reset period.

18. The method of claim 17, further comprising:
validating the radon test based at least in part on said received validation data.

19. The method of claim 18, wherein said validating a radon test based at least in part on said received validation data comprises:
analyzing the received validation data to determine consistent use of a radon sensor providing the radon data, consistent placement of the radon sensor, and/or consistent air quality of an environment surrounding the radon sensor over the predetermined period of time.

20. The method of claim 17, wherein said receiving validation data comprises:
receiving validation data indicative of at least an identification of a radon sensor providing the radon data.

21. A machine-accessible medium having associated instructions, which, when accessed, results in a machine:
receiving, over a predetermined period of time, radon data indicative of sensed radon;
receiving, over the predetermined period of time, validation data to validate a radon test that utilizes said received radon data;
receiving an indication that a radon detector accumulating the radon data was powered off for an amount of time; and
providing a reset command to the radon detector if the amount of time is greater than a predetermined reset period.

22. The machine-accessible medium of claim 21, wherein the associated instructions, when accessed, further results in the machine:
validating the radon test based at least in part on received validation data.

23. The machine-accessible medium of claim 21, wherein the associated instructions, when accessed, further results in the machine validating the radon test based at least in part on received validation data by:
analyzing the received validation data to determine consistent use of a radon sensor providing the radon data, consistent placement of the radon sensor, and/or consistent air quality of an environment surrounding the radon sensor over the predetermined period of time.

* * * * *

UNITED STATES PATENT AND TRADEMARK OFFICE
CERTIFICATE OF CORRECTION

| | | |
|---|---|---|
| PATENT NO. | : 7,317,185 B2 | Page 1 of 1 |
| APPLICATION NO. | : 11/610302 | |
| DATED | : January 8, 2008 | |
| INVENTOR(S) | : Meindert J. Kleefstra | |

It is certified that error appears in the above-identified patent and that said Letters Patent is hereby corrected as shown below:

In the Claims:

Col. 9, line 24 "[Claim 14.] ...indicative if sensed radon;..." should read --...indicative of sensed radon...--.

Signed and Sealed this
Ninth Day of August, 2011

David J. Kappos
*Director of the United States Patent and Trademark Office*